United States Patent
Guidotti et al.

(10) Patent No.: US 9,598,511 B2
(45) Date of Patent: Mar. 21, 2017

(54) CATALYST COMPONENTS FOR THE POLYMERIZATION OF OLEFINS

(71) Applicant: Basell Poliolefine Italia S.r.l., Milan (IT)

(72) Inventors: Simona Guidotti, Ferrara (IT); Dario Liguori, Ferrara (IT); Giampiero Morini, Ferrara (IT); Fabrizio Piemontesi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/782,573

(22) PCT Filed: Apr. 2, 2014

(86) PCT No.: PCT/EP2014/056625
§ 371 (c)(1),
(2) Date: Oct. 5, 2015

(87) PCT Pub. No.: WO2014/161905
PCT Pub. Date: Oct. 9, 2014

(65) Prior Publication Data
US 2016/0032026 A1 Feb. 4, 2016

(30) Foreign Application Priority Data

Apr. 5, 2013 (EP) .................................... 13162413

(51) Int. Cl.
| | |
|---|---|
| C08F 4/649 | (2006.01) |
| C08F 4/652 | (2006.01) |
| C08F 10/06 | (2006.01) |
| C08F 4/657 | (2006.01) |
| C08F 4/642 | (2006.01) |
| C08F 110/06 | (2006.01) |

(52) U.S. Cl.
CPC ............ *C08F 10/06* (2013.01); *C08F 4/6421* (2013.01); *C08F 4/6574* (2013.01); *C08F 110/06* (2013.01); *C08F 2410/01* (2013.01)

(58) Field of Classification Search
CPC .......... C08F 4/6421; C08F 4/643; C08F 4/54; C08F 4/6543; C08F 4/6574
See application file for complete search history.

(56) References Cited

U.S. PATENT DOCUMENTS

| | | |
|---|---|---|
| 6,759,362 B2 | 7/2004 | Job |
| 2013/0244863 A1 | 9/2013 | Xu |

FOREIGN PATENT DOCUMENTS

| | | |
|---|---|---|
| CN | 1423653 A | 6/2003 |
| JP | S55120607 A | 9/1980 |
| JP | S5622302 A | 3/1981 |
| JP | 2010155948 A | 7/2010 |
| JP | 2010155949 A | 7/2010 |
| JP | 2010155950 A | 7/2010 |

OTHER PUBLICATIONS

Database WPI, Week201050, Thomson Scientific, London, GB; AN 2010-J17500 XP002714812, & JP2010 155949 A (Japan Polychem Corp) Jul. 5, 2010 (Jul. 15, 2010) cited in the application abstract paragraph [0102]-paragraph [0125] claims 1-10.
K. Soga et al.; "The effect of magesium chloride on the polymerization of alpha-olefins", Int. Congr. Catal.Proc., vol. 5, 1984, pp. V349-V358, XP009173488, FRG pp. V-354.
PCT International Search Report—Mailed Sep. 10, 2014 for Corresponding PCT/EP2014/056625.

*Primary Examiner* — Caixia Lu

(57) ABSTRACT

A solid catalyst component for the (co)polymerization of olefins $CH_2=CHR$, in which R is a hydrocarbyl radical with 1-12 carbon atoms, optionally in mixture with ethylene, comprising Ti, Mg, Cu, Cl, and an electron donor compound characterized by the fact that the Cu/Ti weight ratio is lower than 0.5.

11 Claims, No Drawings

CATALYST COMPONENTS FOR THE POLYMERIZATION OF OLEFINS

This application is the U.S. National Phase of PCT International Application PCT/EP2014/056625, filed Apr. 2, 2014, claiming benefit of priority to European Patent Application No. 13162413.2, filed Apr. 5, 2013, the contents of which are incorporated herein by reference in its entirety.

FIELD OF THE INVENTION

The present invention relates to catalyst components for the (co)polymerization of olefins, in particular propylene, comprising Mg, Cu, Ti and halogen elements and at least an electron donor compound. The present invention further relates to the catalysts obtained from said components and to their use in processes for the (co)polymerization of olefins in particular propylene.

BACKGROUND OF THE INVENTION

Catalyst components for the stereospecific polymerization of olefins, such as propylene, are widely known in the art and they are of the Ziegler-Natta category type. The first catalyst of this type widely used in the industry was based on the use of solid $TiCl_3$ obtained by reduction of $TiCl_4$ with aluminum alkyls. The activity and stereospecificity of the catalysts were not so high so that the polymer had to be subject to a deashing treatment to remove the catalyst residues and to a washing step for removing the atactic polymer produced. Nowadays, the most spread out catalyst family used industrially comprises a solid catalyst component, constituted by a magnesium dihalide on which are supported a titanium compound and an internal electron donor compound, used in combination with an Al-alkyl compound. Conventionally these catalysts are used together with an external donor (for example an alkoxysilane) which helps in obtaining higher isotacticity. One of the preferred classes of internal donors is constituted by the esters of phthalic acid, diisobutylphthalate being the most used. The phthalates are used as internal donors in combination with alkylalkoxysilanes as external donor. This catalyst system is capable of giving good performances in terms of activity, and propylene polymers with high isotacticity and xylene insolubility. It is however of general interest the possibility of increasing the intrinsic capability of the solid catalyst components, particularly of those based on donors different from phthalates, to produce stereoregular polymers. In fact, an intrinsically more stereospecific catalyst component would allow to use a lower amount of stereoregulating external donor to reach the target of polymer xylene insolubility and this, in turn, would be translated into the possibility of obtaining a higher plant productivity.

Based on this, it would be very convenient to find a way of improving the stereospecificity of a solid catalyst component and in particular it would be convenient that this method be of a wide applicability.

Since the discovery of magnesium chloride based supports numerous attempts have been made to include in it additional compounds with the aim of imparting new or modified properties to the final catalysts.

In U.S. Pat. No. 4,613,655 substantial amounts (30% by weight or higher) of different inorganic compounds and, among them $Cu_2Cl_2$ (table VII), is mixed with $MgCl_2$ and then ground in the presence of $TiCl_4$ in order to produce a catalyst. Apart from the effect of dilution of $MgCl_2$, the catalyst, used in the ethylene polymerization, the catalyst did not show any improvement from the presence of $Cu_2Cl_2$.

JP2010-155949 discloses the preparation of solid catalysts components according to several techniques all of them having in common the use of copper containing compounds at various stages of preparation. Depending on the preparation technique and specific ingredients, the final amount of Cu in the catalyst (table 1 and 2) and its relative ratio with Ti may vary from Cu/Ti weight ratio of 1.91 (Ex. 1, the highest) to 0.55 (Ex. 7, the lowest).

According to this reference, the catalyst components containing Cu allows to get increase in the catalyst activity while the stereospecificity is maintained at the same level of the comparative catalyst (not containing Cu) or slightly increased. This is confirmed by the review carried out on examples 1-3 and comparative example 1 in table 1 (all catalyst prepared with the same technique) showing that an increase in stereospecificity with respect to the catalyst not containing Cu (Comparative 1; CXS 2.3) was obtained only for the catalysts (1-2) in which the weight ratio Cu/Ti was higher than 1 and in particular the trend clearly shows a linear decrease of stereospecificity (expressed by increasing values of CXS i.e., amount of low crystallinity soluble matter) going from Cu/Ti weight ratio of 1.91 (EX. 1 CXS1.1) to weight ratio Cu/Ti 0.77 (EX3, CXS 2.3 as in the comparative example 1). It has to be reported that when the catalyst is prepared according to a different technique (Example 4) the increase in sterospecificity with respect to catalyst not containing Cu (comparative example 2) is not seen at all. In addition, when the catalyst is prepared according to a still different technique and the Cu/Ti weight ratio is 0.55 the stereospecificity with respect to the same catalyst without Cu (comparative example 5) is even slightly worsened.

The same teaching described above is also reported in JP2010-155948 and JP2010-155950.

Now the applicant has surprisingly found that it is possible to increase the stereospecificity of catalyst components based on Mg containing support on which are supported titanium atoms and donors by modifying it with specific amounts of Cu compounds.

SUMMARY OF THE INVENTION

It is therefore an object of the present invention a solid catalyst component comprising Ti, Mg, Cu, Cl, and an electron donor compound characterized by the fact that the Cu/Ti weight ratio is lower than 0.5.

DETAILED DESCRIPTION OF THE INVENTION

Preferably, in the catalyst component of the present invention the Cu/Ti weight ratio ranges from 0.1 to 0.45.

Preferably the amount of Cu is lower than 2%, more preferably equal to or lower than 1.8 and especially lower than 1.5% based on the total weight of the solid catalyst component. The Cu/Mg molar ratio preferably ranges from 0.001 to 0.05.

Preferably, more than 60% and more preferably more than 70% of the titanium atoms are in +4 valence state. The total amount of Ti is typically equal to or higher than 0.5 and preferably higher than 0.8% wt with respect to the total weight of the solid catalyst component. In a specific embodiment it ranges from 0.5 to 3% more preferably from higher than 0.8 to 2.5% and especially in the range in the range 1.1-2.5% wt. This latter range is particularly preferred in combination with the use of cu atoms deriving from CuCl$_2$ and esters of optionally substituted aromatic mono or polycarboxylic acids as internal donors.

The particles of solid component have substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

The Mg atoms preferably derive from magnesium chloride, preferably from magnesium dichloride and more preferably from magnesium dichloride in active form meaning that it is characterized by X-ray spectra in which the most intense diffraction line which appears in the spectrum of the non active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The titanium atoms preferably derive from titanium compounds of formula Ti(OR)$_n$X$_{4-n}$ in which n is comprised between 0 and 4; X is halogen and R is an hydrocarbon radical, preferably alkyl, radical having 1-10 carbon atoms or a COR group. Among them, particularly preferred are titanium compounds having at least one Ti-halogen bond such as titanium tetrahalides or halogenalcoholates. Preferred specific titanium compounds are TiCl$_4$, and Ti(OEt)Cl$_3$.

The components of the invention also comprise an electron donor compound (internal donor), selected from esters, ethers, amines, silanes and ketones or mixtures thereof. Particularly preferred classes are alkyl and aryl esters of optionally substituted aromatic mono or polycarboxylic acids such as for example esters of benzoic and phthalic acids, and esters of aliphatic acids selected from malonic, glutaric and maleic acids. Specific examples of such esters are n-butylphthalate, di-isobutylphthalate, di-n-octylphthalate, ethyl-benzoate and p-ethoxy ethyl-benzoate. Also, the diesters disclosed in WO2010/078494 and U.S. Pat. No. 7,388,061 can be used. Among this class, particularly preferred are the 2,4-pentanediol dibenzoate derivatives. Moreover, can be advantageously used also the 1,3 diethers of the formula:

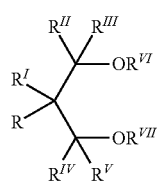

(I)

wherein R, R$^I$, R$^{II}$, R$^{III}$, R$^{IV}$ and R$^V$ equal or different to each other, are hydrogen or hydrocarbon radicals having from 1 to 18 carbon atoms, and R$^{VI}$ and R$^{VII}$, equal or different from each other, have the same meaning of R-R$^V$ except that they cannot be hydrogen; one or more of the R-R$^{VII}$ groups can be linked to form a cycle. The 1,3-diethers in which R$^{VI}$ and R$^{VII}$ are selected from C$_1$-C$_4$ alkyl radicals are particularly preferred.

Preferably, the final amount of electron donor compound in the solid catalyst component ranges from 1 to 25% by weight preferably in the range from 3 to 20% by weight.

The Cu atoms preferably derive from one or more Cu compounds not having Cu-carbon bonds. In particular the Cu compounds can be selected from Cu halides, Cu carbonate, Cu acetate, Cu nitrate, Cu oxide, Cu sulphate, Cu sulfide. Compounds in which Cu has the valence +2 are preferred. Among Cu halides, preferred are Cu dichloride and Cu dibromide. The most preferred Cu compounds are CuO, CuCl$_2$, and Cu diacetate. It is particularly preferred to use compounds in which Cu has the valence +2 in such an amount to leave less than 1.5% wt of Cu in the final solid catalyst component.

The preparation of the solid catalyst component can be carried out according to several methods.

According to one of these methods, the magnesium dichloride in an anhydrous state, the titanium compound, the Cu compound and the electron donor compounds are milled together under conditions in which activation of the magnesium dichloride occurs. The so obtained product can be treated one or more times with an excess of TiCl$_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound, the Cu compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. Any Cu compound of the invention can be used in the comilling technique, and CuO and CuCl$_2$ are the most preferred. When using the milling technique for preparing the catalyst component the final amount of Cu preferably range from 0.1 to 1.5% by weight and the preferred internal donors are the alkyl esters of phthalic acids.

According to another preferred method, the solid catalyst component can be prepared by reacting a titanium compound of formula Ti(OR)$_{q-y}$X$_y$, where q is the valence of titanium and y is a number between 1 and q, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. Examples of spherical adducts prepared according to this procedure are described in U.S. Pat. Nos. 4,399,054 and 4,469,648. The so obtained adduct can be directly reacted with Ti compound by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound is added in the desired ratios during the treatment with TiCl$_4$. Several ways are available to add the Cu compound. According to the preferred option, the Cu compound is incorporated directly into the MgCl$_2$.pROH adduct during its preparation. In particular, the Cu compound can be added at the initial stage of adduct preparation by mixing it together with MgCl$_2$ and the alcohol. Alternatively, it can be added to the molten adduct before the emulsification step. Preferred Cu compound to be incorporated directly into the $MgCl_2 \cdot pROH$ adduct are $CuCl_2$, CuO and $Cu(AcO)_2$. When using CuO it is preferred although not strictly necessary use it in very small particle size and in particular in the form of nano particles i.e., particles having at least one dimension in the range of nanometers.

The preparation of catalyst components in spherical form are described for example in European Patent Applications EP-A-395083, EP-A-553805, EP-A-553806, EPA601525 and WO98/44001.

The solid catalyst component has an average particle size ranging from 5 to 120 μm and more preferably from 10 to 100 μm.

As mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification etc.

Regardless of the preparation method used, the final amount of the electron donor compound is such that its molar ratio with respect to the $TiCl_4$ is from 0.01 to 2, preferably from 0.05 to 1.2.

The solid catalyst components according to the present invention are converted into catalysts for the polymerization of olefins by reacting them with organoaluminum compounds according to known methods.

In particular, an object of the present invention is a catalyst for the polymerization of olefins $CH_2$=CHR, in which R is a hydrocarbyl radical with 1-12 carbon atoms, optionally in mixture with ethylene, comprising the product obtained by contacting:

(i) the solid catalyst component as disclosed above and
(ii) an alkylaluminum compound and,
(iii) an external electron donor compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminums.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. Particularly preferred are the silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, the silicon compounds in which a is 0, c is 3, $R_7$ is a branched alkyl or cycloalkyl group, optionally containing heteroatoms, and $R_8$ is methyl are also preferred. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2$=CHR, in which R is hydrogen or a hydrocarbyl radical with 1-12 carbon atoms, carried out in the presence of a catalyst comprising the product of the reaction between:

(i) the solid catalyst component of the invention;
(ii) an alkylaluminum compound and,
iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

As already explained, the catalyst of the invention show, in propylene homopolymerization an increased activity/stereospecificity balance particularly due to increased stereospecificity compared with prior art catalysts not containing Cu atoms or containing a too high amount of Cu. It has been also observed that the catalyst of the invention show a particularly interesting behavior also in the copolymerization of propylene with minor amounts of ethylene and/or other olefins $CH_2$=CHR for the preparation of propylene copolymers containing up to 10% weight of ethylene and/or said $CH_2$=CHR olefins different from propylene.

The following examples are given in order to better illustrate the invention without limiting it.

EXAMPLES

Characterizations
Determination of Mg, $Ti_{(TOT)}$ and Cu
The determination of Mg, $Ti_{(TOT)}$ and Cu content in the solid catalyst component has been carried out via inductively coupled plasma emission spectroscopy on "I.C.P Spectrometer ARL Accuris".

The sample was prepared by analytically weighting, in a "Fluxy" platinum crucible", 0.1÷0.3 grams of catalyst and 2 grams of lithium metaborate/tetraborate 1/1 mixture. After addition of some drops of KI solution, the crucible is inserted in a special apparatus "Claisse Fluxy" for the complete burning. The residue is collected with a 5% v/v $HNO_3$ solution and then analyzed via ICP at the following wavelengths: Magnesium, 279.08 nm; Titanium, 368.52 nm; Copper, 327.40 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

EXAMPLES

Procedure for the Preparation of the Phthalate-Based Milled Solid Catalyst Component Magnesium dichloride anhydrous, diisobutylphthalate in amount such as to have a Mg/DIBP molar ratio of 17 were introduced into a four ball mill together with a copper compound of the type and amount indicated in Table 1. The components were milled together at room temperature for 6 h. The resulting solid catalyst precursors were treated with an excess of $TiCl_4$: the temperature was raised to 100° C. and maintained for 2 h. Thereafter, stirring was stopped, the solid product was allowed to settled and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Diether-Based Milled Solid Catalyst Component Magnesium dichloride anhydrous, 9,9-bis(methoxymethyl)fluorene in amount such as to have a Mg/diether molar ratio of 17 were introduced into a four ball mill together with a copper compound of the type and amount indicated in Table 2. The components were milled together at room temperature for 6 h. The resulting solid catalyst precursors were treated with an excess of $TiCl_4$: the temperature was raised to 100° C. and maintained for 2 h. Thereafter, stirring was stopped, the solid product was allowed to settled and the supernatant liquid was siphoned off at 100° C. After the supernatant was removed, additional fresh $TiCl_4$ was added to reach the initial liquid volume again. The mixture was then heated at 110° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Spherical Adduct

Microspheroidal $MgCl_2.pC_2H_5OH$ adduct was prepared according to the method described in Example 2 of WO98/44009, but operating on larger scale and optionally adding a copper compound of the type and amount indicated in Tables 3 and 4.

Procedure for the Preparation of the Phthalate-Based Solid Catalyst Component from the Spherical Adduct Into a 500 ml round bottom flask, equipped with mechanical stirrer, cooler and thermometer 300 ml of $TiCl_4$ were introduced at room temperature under nitrogen atmosphere. After cooling to 0° C., while stirring, diisobutylphthalate and 9.0 g of the spherical adduct (prepared as described above) were sequentially added into the flask. The amount of charged internal donor was such to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Diether-Based Solid Catalyst Component from the Spherical Adduct Into a 500 ml round bottom flask, equipped with mechanical stirrer, cooler and thermometer 300 ml of $TiCl_4$ were introduced at room temperature under nitrogen atmosphere. After cooling to 0° C., while stirring, 9,9-bis(methoxymethyl)fluorene and 9.0 g of the spherical adduct (prepared as described above) were sequentially added into the flask. The amount of charged internal donor was such to have a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 110° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. A suspension containing 75 ml of anhydrous hexane, 0.76 g of $AlEt_3$ (6.66 mmol), 0.33 mmol of external donor and 0.006÷0.010 g of solid catalyst component, previously precontacted for 5 minutes, was charged. Either dicyclopentyldimethoxysilane, D donor, or cyclohexylmethyldimethoxysilane, C donor, were used as external donor as specified in Tables 1 and 2. All tests reported in Table 3 were carried out with C donor, while some tests described in Tables 2 and 4 were carried out without any external donor. The autoclave was closed and the desired amount of hydrogen was added (in particular, 2 NL in D donor tests, 1.5 NL in C donor tests and 1.25 NL in tests without external donor were used). Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. Then the polymer was weighed and characterized.

Examples 1-2 and Comparative Examples C1-C4

The phthalate-based milled solid catalyst components were prepared using the general method described above. Their composition and related propylene polymerization performance are indicated in Table 1.

Examples 3-5 and Comparative Examples C5-C10

The diether-based milled solid catalyst components were prepared using the general method described above. Their composition and related propylene polymerization performance are indicated in Table 2.

Examples 6-15 and Comparative Examples C11-C13

The phthalate-based solid catalyst components were prepared from spherical adducts $MgCl_2 \cdot pC_2H_5OH$ using the general method described above. The only difference was in Example 14 where 10.0 g of spherical support (instead of 9.0) were reacted with an initial amount of 250 cm$^3$ of TiCl$_4$ (instead of 300 cm$^3$) Their composition and related propylene polymerization performance are indicated in Table 3.

Examples 16-23 and Comparative Examples C14-C17

The diether-based solid catalyst components were prepared from spherical adducts $MgCl_2 \cdot pC_2H_5OH$ using the general method described above. Their composition and related propylene polymerization performance are indicated in Table 4.

TABLE 1

Phthalate-based milled solid catalyst components

| | Milling Conditions | | Solid Catalyst Component | | | | | Polymerization | | |
|---|---|---|---|---|---|---|---|---|---|---|
| | Cu compound | Cu/Mg % mol | Mg % wt. | Ti % wt. | Cu % wt. | DIBP % wt. | Cu/Ti wt./wt. | ED type | Mileage Kg/g | XI % wt. |
| Ex. 1 | CuCl$_2$ | 1.2 | 21.4 | 1.9 | 0.51 | 6.5 | 0.26 | D | 54 | 98.2 |
| Ex. 2 | | | | | | | | C | 43 | 97.3 |
| C1 | CuCl$_2$ | 3.8 | 20.4 | 1.7 | 2.00 | 6.7 | 1.18 | D | 24 | 97.7 |
| C2 | | | | | | | | C | 21 | 96.9 |
| C3 | none | — | 20.6 | 2.1 | — | 6.8 | — | D | 39 | 97.6 |
| C4 | | | | | | | | C | 32 | 96.8 |

DIBP = diisobutyl phthalate

TABLE 2

Diether-based milled solid catalyst components

| | Milling Conditions | | Solid Catalyst Component | | | | | Polymerization | | |
|---|---|---|---|---|---|---|---|---|---|---|
| | Cu Comp. | Cu/Mg % mol | Mg % wt. | Ti % wt. | Cu % wt. | Diether % wt. | Cu/Ti wt./wt. | ED type | Mileage Kg/g | XI % wt. |
| Ex. 3 | CuCl2 | 1.8 | 20.9 | 1.7 | 0.56 | 5.3 | 0.32 | D | 35 | 97.4 |
| Ex. 4 | | | | | | | | C | 35 | 97.6 |
| Ex. 5 | | | | | | | | none | 48 | 96.1 |
| C5 | CuCl2 | 3.5 | 20.3 | 1.5 | 1.33 | 5.3 | 0.87 | D | 32 | 97.9 |
| C6 | | | | | | | | C | 32 | 97.5 |
| C7 | | | | | | | | none | 40 | 95.0 |
| C8 | none | — | 22.3 | 1.2 | — | 5.2 | — | D | 21 | 97.7 |
| C9 | | | | | | | | C | 20 | 97.3 |
| C10 | | | | | | | | none | 34 | 95.0 |

Diether = 9,9-bis(methoxymethyl)fluorene

TABLE 3

Phthalate-based solid catalyst components from spherical adducts

| | Support Synthesis | | Support Composition | | | Solid Catalyst Component | | | | | Polymerization | |
|---|---|---|---|---|---|---|---|---|---|---|---|---|
| | Cu Comp. | Cu/ Mg % mol | Mg % wt. | Cu % wt. | EtOH/ Mg m.r. | Mg % wt. | Ti % wt. | Cu % wt. | DIBP % wt. | Cu/Ti wt./wt. | Mileage Kg/g | XI % wt. |
| Ex. 6 | CuO | 2.0 | 10.2 | 0.45 | 2.9 | 18.3 | 2.6 | 0.73 | 11.6 | 0.28 | 74 | 97.9 |
| Ex. 7 | | 3.0 | 9.7 | 0.70 | 3.3 | 18.6 | 2.6 | 1.15 | 11.7 | 0.45 | 65 | 98.1 |
| Ex. 8 | Cu(OAc)$_2$ | 1.0 | 10.3 | 0.20 | 2.9 | 19.0 | 2.2 | 0.36 | 10.6 | 0.16 | 74 | 98.3 |
| Ex. 9 | | 2.0 | 10.2 | 0.50 | 3.0 | 18.5 | 2.5 | 0.68 | 12.2 | 0.27 | 73 | 97.9 |

TABLE 3-continued

Phthalate-based solid catalyst components from spherical adducts

| | | | | | | | | | | | | |
|---|---|---|---|---|---|---|---|---|---|---|---|---|
| Ex. 10 | CuCl$_2$ | 3.0 | 10.3 | 0.75 | 3.0 | 17.8 | 2.6 | 1.26 | 11.3 | 0.48 | 74 | 97.9 |
| Ex. 11 | | 1.0 | 10.6 | 0.30 | 2.9 | 18.3 | 2.6 | 0.45 | 10.9 | 0.17 | 67 | 98.0 |
| Ex. 12 | | 2.0 | 10.3 | 0.55 | 3.0 | 18.4 | 3.0 | 0.93 | 8.8 | 0.31 | 65 | 98.0 |
| Ex. 13 | | 3.0 | 10.0 | 0.70 | 3.1 | 18.3 | 2.7 | 1.30 | 10.3 | 0.48 | 62 | 98.2 |
| Ex. 14 | | 2.0 | 10.5 | 0.5 | 2.8 | 18.4 | 2.4 | 0.92 | 12.3 | 0.39 | 83 | 98.5 |
| C11 | none | — | 10.3 | — | 2.9 | 18.8 | 2.9 | — | 13.6 | — | 83 | 97.6 |

| | Support Synthesis | | Support Composition | | | Solid Catalyst Component | | | | | Polymerization | |
|---|---|---|---|---|---|---|---|---|---|---|---|---|
| | Cu Comp. | Cu/Mg mol | Mg % wt | Cu % wt | EtOH/Mg m.r. | Mg % wt. | Ti % wt | Cu % wt. | DIBP % wt | Cu/Ti wt./wt | Mileage Kg/g | XI % wt. |
| Ex. 15 | Cu(OAc)2 | 2.0 | 12.0 | 0.60 | 2.2 | 18.4 | 2.3 | 0.82 | 11.3 | 0.36 | 66 | 98.2 |
| C12 | Cu(OAc)2 | 3.0 | 12.1 | 0.90 | 2.0 | 18.9 | 2.0 | 1.28 | 8.1 | 0.63 | 62 | 97.6 |
| C13 | none | — | 12.2 | — | 2.1 | 19.6 | 2.8 | — | 10.3 | — | 67 | 97.6 |

DIBP = diisobutyl phthalate.
External donor = cyclohexylmethyldimethoxysilane (C donor)

TABLE 4

Diether-based solid catalyst components from spherical adducts

| | Support Synthesis | | Support Composition | | | Solid Catalyst Component | | | | | Polymerization | | |
|---|---|---|---|---|---|---|---|---|---|---|---|---|---|
| | Cu compd | Cu/Mg mol | Mg % wt. | Cu % wt. | EtOH/Mg m.r. | Mg % wt | Ti % wt | Cu % wt. | Diether % wt. | Cu/Ti wt./wt | ED type | Mileage Kg/g | XI % wt. |
| Ex. 16 | Cu(OAc)$_2$ | 1.0 | 10.3 | 0.20 | 2.9 | 15.5 | 4.2 | 0.21 | 12.8 | 0.05 | D | 93 | 98.7 |
| Ex. 17 | | | | | | | | | | | none | 135 | 97.0 |
| Ex. 18 | | 3.0 | 10.3 | 0.75 | 3.0 | 15.1 | 3.7 | 0.77 | 15.8 | 0.21 | D | 108 | 98.4 |
| Ex. 19 | | | | | | | | | | | none | 140 | 97.5 |
| Ex. 20 | CuCl$_2$ | 2.0 | 10.3 | 0.55 | 3.0 | 15.2 | 4.1 | 0.52 | 17.5 | 0.13 | D | 107 | 98.9 |
| Ex. 21 | | | | | | | | | | | none | 145 | 97.9 |
| C14 | none | — | 10.2 | — | 3.0 | 14.3 | 5.5 | — | 16.4 | — | D | 84 | 98.2 |
| C15 | | | | | | | | | | | none | 143 | 96.0 |

| | Support Synthesis | | Support Composition | | | Solid Catalyst Component | | | | | Polymerization | | |
|---|---|---|---|---|---|---|---|---|---|---|---|---|---|
| | Cu Comp. | Cu/Mg mol | Mg % wt. | Cu % wt. | EtOH/Mg m.r. | Mg % wt. | Ti % wt. | Cu % wt. | Diether % wt. | Cu/Ti wt./wt | ED type | Mileage Kg/g | XI % wt. |
| Ex. 22 | Cu(OAc)$_2$ | 3.0 | 12.1 | 0.90 | 2.0 | 15.7 | 3.6 | 0.73 | 11.5 | 0.21 | D | 74 | 98.6 |
| Ex. 23 | | | | | | | | | | | none | 120 | 96.2 |
| C16 | none | — | 12.8 | — | 2.0 | 15.0 | 5.5 | — | 10.8 | — | D | 60 | 97.8 |
| C17 | | | | | | | | | | | none | 97 | 94.0 |

Diether = 9,9-bis(methoxymethyl)fluorene

What is claimed is:

1. A solid catalyst component for the (co)polymerization of olefins CH$_2$=CHR, wherein R is a hydrocarbyl radical with 1-12 carbon atoms, with optional ethylene, comprising Ti, Mg, Cu, Cl, and an electron donor compound wherein the Cu/Ti weight ratio is lower than 0.5, the amount of Cu is lower than 2% by weight based on the total weight of the solid catalyst component, and when the Cu atoms are derived from CuCl$_2$, the electron donor is selected from alkyl and aryl esters of substituted aromatic mono- or polycarboxylic acids, and the amount of Ti ranges from 1.1-2.5% of the total weight of the solid catalyst component.

2. The solid catalyst component of claim 1 in which the Cu/Ti weight ratio ranges from 0.1 to 0.45.

3. The solid catalyst component of claim 1 in which the Cu/Mg molar ratio ranges from 0.001 to 0.05.

4. The solid catalyst component of claim 1 in which the Cu atoms have valence +2.

5. The solid catalyst component of claim 1 in which electron donor compound is selected from esters, ethers, amines, silanes and ketones or mixtures thereof.

6. The solid catalyst component of claim 1 in which electron donor compound is selected from the group consisting of alkyl and aryl esters of optionally substituted aromatic mono or polycarboxylic, esters of malonic acids, esters of glutaric acids and esters of maleic acids and 1,3 diethers of the formula:

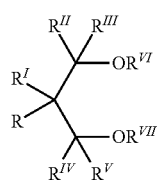

(I)

wherein R, $R^I$, $R^{II}$, $R^{III}$, $R^{IV}$ and $R^V$ independently, are hydrogen or hydrocarbon radicals having from 1 to 18 carbon atoms, and $R^{VI}$ and $R^{VII}$, equal or different from each other, have the same meaning of R-$R^V$ except that they are hydrogen; one or more of the R-$R^{VII}$ groups are optionally linked to form a cycle.

7. A catalyst for the polymerization of olefins $CH_2$=CHR, in which R is a hydrocarbyl radical with 1-12 carbon atoms, optionally in mixture with ethylene, comprising the product obtained by contacting:
(i) the solid catalyst component according to claim 1;
(ii) an alkylaluminum compound and,
(iii) optionally an external electron donor compound.

8. The catalyst of claim 6 wherein the alkyl-Al compound (ii) is a trialkyl aluminum compound.

9. The catalyst of claim 7 in which the external donor compounds is selected from silicon compounds of formula $(R_6)_a(R_7)_b Si(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms.

10. A process for the (co)polymerization of olefins $CH_2$=CHR, in which R is hydrogen or a hydrocarbyl radical with 1-12 carbon atoms, carried out in the presence of the catalyst according to claim 1.

11. The process of claim 10 in which propylene and small amounts of ethylene and/or other olefins $CH_2$=CHR are copolymerized to produce propylene copolymers containing up to 10% weight of ethylene and/or said $CH_2$=CHR olefins different from propylene.

* * * * *